United States Patent [19]

Nath

[11] 3,920,980

[45] Nov. 18, 1975

[54] FLEXIBLE LIGHT GUIDE

[76] Inventor: Gunther Nath, Speyerstr, 21, 8 Munich 23, Germany

[22] Filed: July 18, 1974

[21] Appl. No.: 483,676

[52] U.S. Cl. ............ 240/1 LP; 219/121 L; 240/47; 250/227; 350/96 R
[51] Int. Cl.² .......................................... G02B 15/14
[58] Field of Search ................ 240/1 LP; 350/96 R; 219/121 L; 128/6; 250/227; 128/303.1

[56] References Cited
UNITED STATES PATENTS

| | | | |
|---|---|---|---|
| 3,467,098 | 9/1969 | Ayres | 350/96 R |
| 3,614,415 | 10/1971 | Edelman | 240/1 LP |
| 3,622,743 | 11/1971 | Muncheryan | 219/121 L |
| 3,666,949 | 5/1972 | DeFalco et al. | 250/227 X |
| 3,739,770 | 6/1973 | Mori | 128/6 |
| 3,776,222 | 12/1973 | Smiddy | 128/6 |
| 3,799,151 | 3/1974 | Fukaumi | 128/6 |
| 3,821,510 | 6/1974 | Muncheryan | 219/121 L |
| 3,834,391 | 9/1974 | Block | 128/303.1 |
| 3,843,865 | 10/1974 | Nath | 350/96 R |

*Primary Examiner*—Richard L. Moses
*Attorney, Agent, or Firm*—Wood, Herron & Evans

[57] ABSTRACT

A flexible light guide especially useful for guiding high power laser beams. The light guide in one form includes a light conducting fiber surrounded by a protective shielding with a liquid cladding in the area between the fiber and the shielding. Both ends of the fiber have an end surface and a tapered area of decreasing circumference joining each end surface with the fiber, the fiber being smaller in diameter than either end surface and the length of the tapered area at one end of the tapered area at the other end. The tapered areas of the fiber are each surrounded by tubes having an inner and an outer diameter. The end of at least one tube is fused to one end of one tube to guarantee perfect suspension of the fiber. The suspension reduces unwanted beam divergence caused by bending of the tapered area.

16 Claims, 6 Drawing Figures

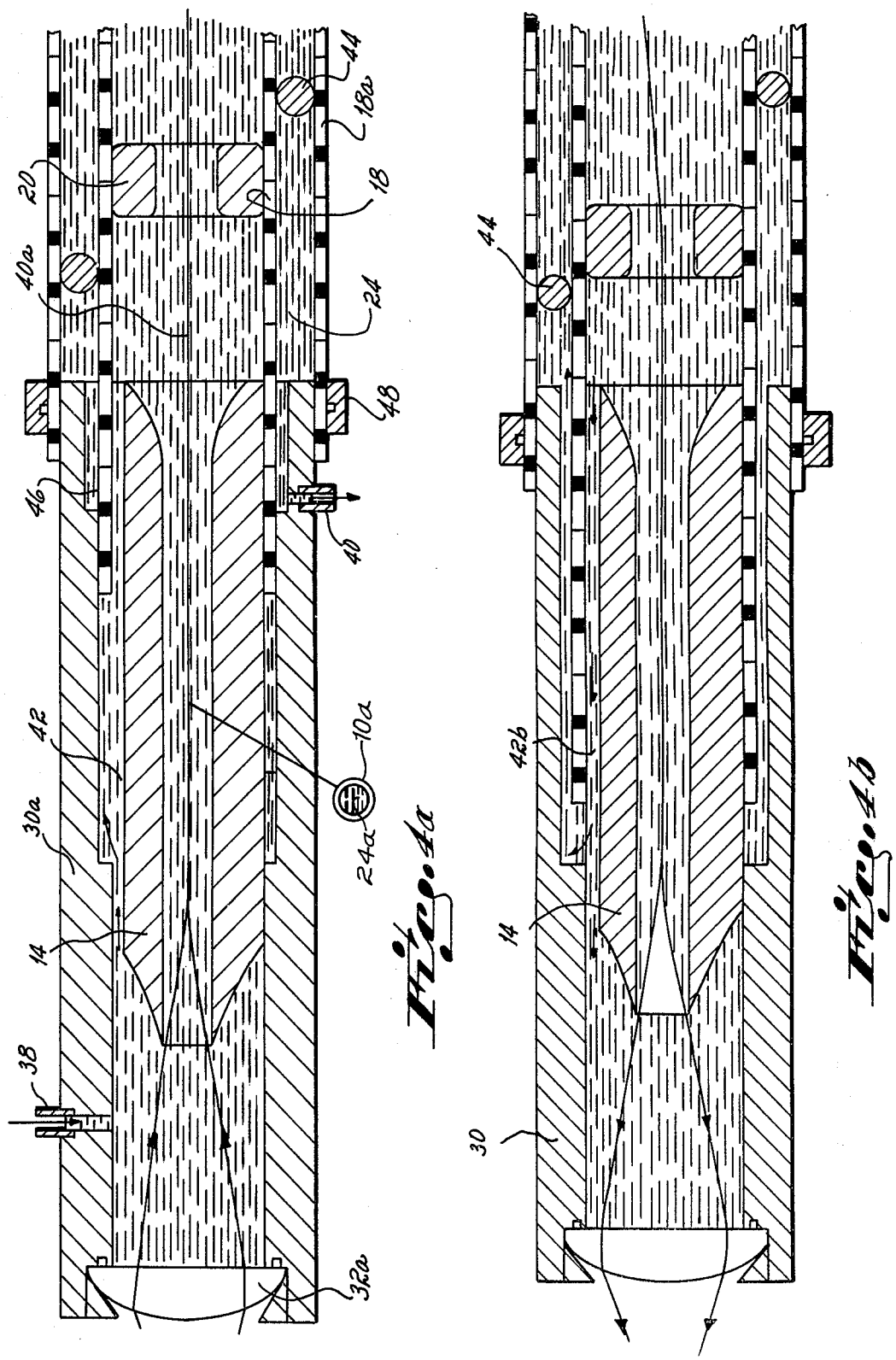

FLEXIBLE LIGHT GUIDE

Flexible light guides with a single light conducting fiber and a surrounding shielding have been described in the DT-OS 2145921. The fiber consists of homogeneous quartz glass, the diameter of its middle part lies between 0.1 and 0.4 mm, both ends are tapered and the light entrance and exit faces have a diameter in the range of 3 mm. The fiber is protected by a flexible tubing which contains circular spacers.

The problem of suspension of this known light guide especially at the ends is not solved optimally. This problem is important, when the radiation of high intensity light sources, e.g., the radiation of a gas laser has to be transmitted. Bending the light guide in its middle part causes a deflection of the less flexible tapered parts and this causes an increase of the divergence of the emitted beam. Furthermore, the suspension of the fiber by metal spacers, as being described in the DT-OS 2145921 causes radiation losses with local heat generation, which may lead to damage of the fiber.

The present invention relates to a better suspension of the former described light guide. Claim 1 describes the solution of this problem. A light guide, according to claim 1 shows a very low output divergence of the transmitted beam, also when a gas laser is used as a light source, which is maintained when said light guide is bended. In addition, the damage of breaking the tapered relatively unflexible fiber ends is strongly reduced by the suspension method described in claim 1.

Further details of the invention are described by the following claims 2–15.

In the following, further examples of a flexible light guide according to the invention as well as additional details are being described by the drawing figures.

FIGS. 4a and 4b show cross sections of the beam entrance and exit end of another example of a flexible light guide according to the invention.

Figures 1A, 1B:
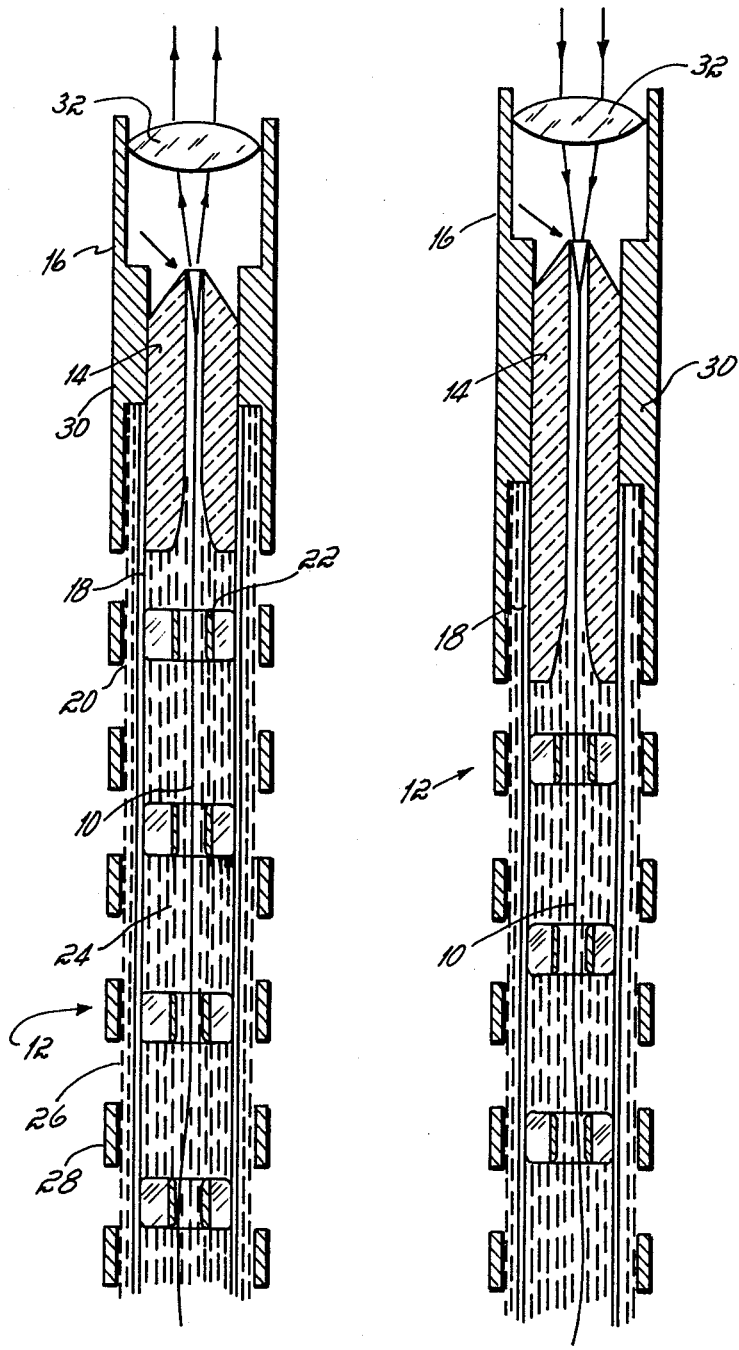
FIG. 1a and FIG. 1b show cross sections of the beam entrance and exit ends of an example of the light guide, according to the invention.

The light guide as being described in FIG. 1 essentially consists of a light conducting fiber 10, which is surrounded by a liquid cladding and a flexible tubing 12 for protection of the fiber against breakage and twisting. The liquid serves also as a cooling substance.

Figures 2, 3:
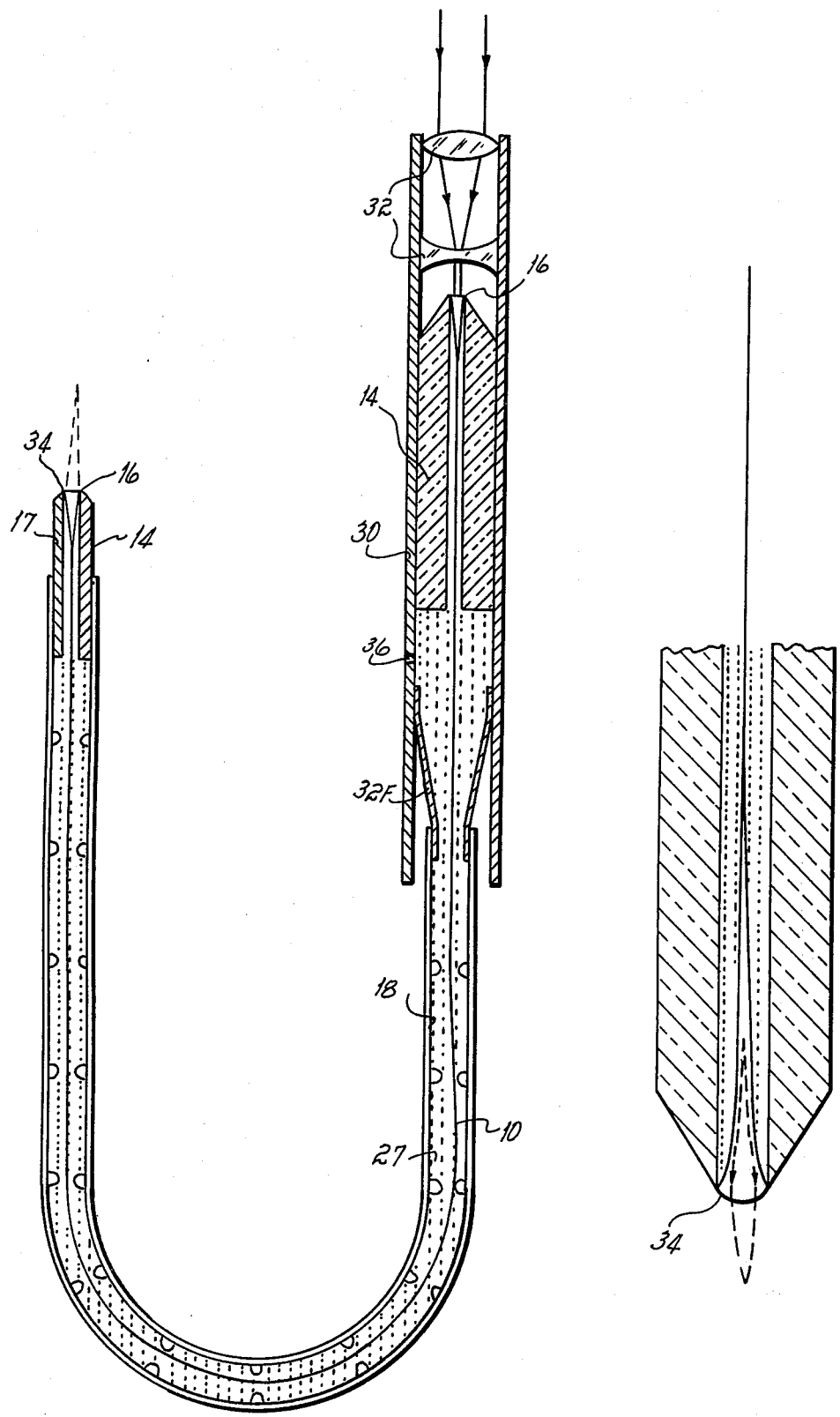
FIG. 2 shows a cross section of another example of the light guide, which is suitable for endoscopic applications.
FIG. 3 shows a magnified view of a part of the light guide as shown in FIGS. 1 and 2.

The light conducting fiber 10 may have a length between 60 and 400 cm. The diameter of its middle flexible part can vary between 30 and 500 $\mu$. The light conducting fiber 10 is preferably tapered on both ends. The light entrance and exit face have a diameter between 0.5 and 2.5 mm. The end faces may be optically polished flat surfaces or may have a curvature, acting as a lens, as shown in FIG. 3.

At the entrance end the tapered part of the fiber may have a length varying between 10 and 50 cm, at the exit end, the length of the tapered part is shorter, lying between 0.5 and 10 cm. The geometrical form of the fiber 10 is thus asymmetric, the light entrance cone being longer than the exit cone.

When the light guide is used for the transmission of very high radiation intensity, the fiber consists preferably of homogeneous quartz glass known by the trade name "Homosil". For the transmission of radiation in the near infrared the fiber is preferably made from waterfree quartz as, e.g., Suprasil W or Infrasil.

When the light guide is used in connection with high intensity laser sources, e.g., Argon or He-ne-lasers, He-Ne-laser, diameter of the flexible middle part of the fiber is preferably 100 $\mu$ and less, the diameter of the end faces lying between 0.5 and 1 mm.

When the light guide is used in connection with a laser having lower brightness but more power (e.g., up to 200 watt c.w.) or emitting pulses with energies up to 100 Joule, the diameter of the middle part of the fiber is between 0.2 and 0.5 mm, the diameter of the end faces is 1–3 mm.

For the transmission of lower laser powers in the visible and near infrared spectral region the light conducting fiber may also consist from glass, or clad glass, with a core having a higher refractive index and a cladding having a lower refractive index.

A third possibility is given by the use of liquid filled glass or quartz glass capillaries, the liquid having a higher refractive index than the capillary material.

Details of these examples will be described in the following text.

The tapered ends of the light conducting fiber are each surrounded by a tube 14. The example of FIG. 1 shows both ends of the fiber 10 being fused to the corresponding ends 16 of the tubes 14. The tubes 14 are shaped like capillaries and consist from the same material as the fiber ends, which are fused to the tubes 14. For the case of a homogeneous fiber of quartz glass the tubes 14 also consist of quartz glass. For the case of a clad fiber the tubes are made from the same material as the cladding or the core or any other glass material, which may be fused to the fiber by heat treatment. When using a 100 $\mu$ fiber the inner diameter of tubes 14 may be between 0.5 and 1 mm, which allows a good alignment of the tapered end parts of the fiber. The length of the tubes is approximately equal to the length of the tapered end parts of the fiber insofar as these tapered parts are still much less flexible as the thin middle part of the fiber. In order to facilitate fusing, the tube ends are shaped like cones, as seen in FIG. 1. The cone angle may be as high as 40° (related to the tube axis).

The tubes 14 may have an outer diameter of 4 mm and an inner diameter between 0.5 and 1 mm. The length of the tube at the light entrance end is typically between 15 and 25 cm, at the exit end the tube is shorter, being in the range from 1–10 cm. Tubes 14 guarantee a perfect suspension of the fiber, also for the case of high radiation power, at the critical points of light entrance and light exit. In addition, the narrow alignment of the tapered fiber parts by the tubes 14 reduces strongly the unwanted dependence of output divergence from bending. Preferably the ends of tubes 14, opposite from the fusing point 16, show a cone shaped increase of the inner diameter, as is shown in FIG. 1. This geometry avoids breaking of the fiber over a sharp edge.

The protective enclosure of the fiber, as it is shown in FIG. 1, contains a flexible tubing 18 made from elastic material, preferably tetrafluoroethylene (teflon) or another material made from fluorocarbons (teflon FEP or teflon PFA). The tubes 14 are inserted into the flexible tubing 18, and sealed by fittings, to avoid leakage of the liquid. Tube 18 contains ring shaped spacers, equally separated from each other, and preferably made from quartz glass or other glass. The rings may be coated at their inner surface with a material, having a lower refractive index than the fiber material. In the case of a quartz glass fiber, the spacers 20 may be coated by a layer 22 of Mg $F_2$ or Ca $F_2$. Optical inhomogeneities can be avoided completely by making the refractive index of the liquid 24 equal to that of the coated dielectric layer.

The flexible tubing 18 is preferably filled by a liquid 24, having a refractive index which is lower by only a few percent than that of the fiber material, which may be, e.g., quartz glass. The liquid has a double function: it serves for optical isolation as well as for cooling. The liquid may not chemically attack the fiber glass and may not escape from tubing 18. When using spacers 20 made from glass, preferably glass with low mechanical hardness, the liquid should have a good wettability towards glass in order to provide good optical isolation by a thin liquid layer, when the fiber contacts the inner surface of a spacer, as it is shown, e.g., in FIG. 1b.

When using a light conducting fiber 10 of quartz glass and tubing 18 from polytetraflouroethylene (PTFE) ethylene glycol or another glycerine like liquid is a suitable liquid 24.

Tubing 18 is surrounded by a flexible metal tubing 26. Tubing 26 contains a thin wire made from steel, fixed at both ends of tubing 26 in order to avoid stretching of the light guide. If tubing 26 allows for a minimum radius of curvature less than a tolerable value with respect to fiber breakage, the minimum radius of curvature can be increased by a plurality of rigid cylindrical metal rings 28 which fit over the flexible tubing 26. The less the distance between these rings 28, the larger will be the minimum radius of curvature of the tubing 26.

At both ends the flexible tubing 26 fits into rigid metal tubes 30, which may also contain optical elements like lenses 32.

The protective tubing of the fiber as described above has the following important characteristics and advantages:

The light conducting fiber is only in contact with dielectric and nonabsorbing materials, i.e., no metal or other absorbing materials. It is further in contact only with materials having a lower refractive index. The optical isolation is given by a liquid with lower refractive index, i.e., not by a solid state material as it is usually being used. As a consequence, for the case of a nonclad quartz fiber, the minimum radius of curvature is extremely small, and the flexibility is very high, since cladding of the fiber by other glass materials would result in less flexibility. At a given minimum radius of curvature, as being depended from the special application, the diameter of the nonclad fiber may be higher as compared to a clad fiber and therefore, the power capability of this fiber is also higher. The optical boundary of glass and liquid is very homogeneous, and the liquid may simultaneously serve as a cooling substance. The metal tubes 30 and the other flexible tubings are not markedly heated up by stray light. The position of the entrance and exit face of the fiber with respect to other optical elements (e.g., lenses 32) is precisely fixed and remains fixed when the fiber is bended.

FIGS. 2 and 3 show an example of the light guide according to the invention. The example of FIG. 2 differs from that of FIG. 1 in the following aspects:

The tubing 18, preferably made from polytetraflouroethylene, which has an outer diameter of about 5 mm and a wall thickness of about 0.5 mm in the example of FIG. 1, has a considerably smaller diameter in FIG. 2, not exceeding 2–3 mm. In addition, the metal tubing 26 is omitted, in order to make the light guide fit into the biopsy channel of an endoscope. The spacers 20, as shown in FIG. 1, may also be omitted in the example of FIG. 2, because due to the medium radiation powers, that have to be transmitted in endoscopic applications. The optical isolation of the liquid 24 and the teflon tubing 18 is sufficient for this case.

In order to adapt the relatively large diameter of the metal tubing 30 to the small diameter of tubing 18 an adapter 32 is introduced, preferably made from glass or quartz glass. The light exit face of the fiber 10 has a positive or negative curvature 34 (FIG. 3). The focal length of this lense may be in the order of 2 cm. The metal tube 30 has a hole 36 for filling the liquid into the tubing 18. In principle, the light guide of FIG. 2 is similar to that of FIG. 1, and therefore needs no further description.

Also the example of FIG. 4 of the invention is similar to that of FIG. 1. In contrast to the light guide of FIG. 1 the fiber consists of a thin glass capillary 10a, preferably quartz glass, which is filled by a light conducting liquid 24a. The capillary 10a serves for optical isolation, i.e., its refractive index is lower as compared to the liquid. The liquid may be a mixture from $CCl_4$ and $CS_2$, thus allowing for transmission at the relatively long wavelength of 3 $\mu$. When using a u. v. transmitting liquid the light guide of FIG. 4 may also be used for the transmission of ultraviolet radiation. In this case the capillary 10a should be made from quartz glass, e.g., "Suprasil".

The light guide of FIG. 4 differs from that of FIG. 1 insofar as the capillary 10a is only fused to the surrounding tube 14 at the light exit end (FIG. 4b), as described earlier. At the light entrance end (FIG. 4a) the capillary 10a may slide within the tube 14, and the liquid serves also as a lubricant. By this procedure, the relatively thick capillary does not so easily break when the light guide is bended. The axial movement of the capillary 10a during bending is in the order of 2 mm, which does not cause a remarkable fluctuation of the transmission characteristics. By fusing the light exit end of the fiber to the tube 14 and suspending it freely inside the tube 14 at the entrance end, gives a sure and safe alignment of the capillary 10a within the protective tubing.

The light guide of FIG. 4 finally differs from that of FIG. 1 insofar as the liquid is flowing in a closed cooling circle. The metal tube 30a at the entrance end is therefor provided with an inlet 38 and outlet 40 for the liquid. The liquid is introduced by the inlet 38 into the space between the lense 32a and the light entrance end of the capillary 10a, flows through a channel 42 into the tubing 18 to the light exit end (FIG. 4b), penetrates through the channel 42a into the space between tubing 18 and another external tubing 18a. The tubings 18 and 18a are held in coaxial position by a helical wire 44. The liquid then flows through 46 at the end of the metal tube 30a to the outlet 40. It is then directed into a pump with heat exchanger and filter, which is not indicated on the drawing.

The principle of the flowing liquid as well as the principle of the fiber end, sliding freely inside the tube 14, can also be applied for the case, when the fiber is not a capillary but rather is a fiber 10 of homogeneous material, as in FIG. 1, where it is made of quartz glass or clad glass. The arrangement with the flowing liquid is important for the case, when very high laser powers of up to 100-200 watt c.w. have to be transmitted. This method of cooling is very effective, and has the further advantage, that the inlet as well as the outlet for the liquid are both at the light entrance end of the light guide, which allows for unobstructed manipulation of the light exit end. The external tubing 18a can be made from the same material as the tubing 18, and can be fixed to the metal tubes 30 and 30a by metal clamps.

I claim:

1. A flexible light guide comprising, in combination: a single light-conducting fiber; a protective shielding containing at least a portion of said fiber; and a tube containing at least a portion of said fiber including one end of said fiber, said tube having an inner diameter and an outer diameter and made of the same material as said fiber, said one end of said fiber being fused to the end of said tube, said tube and said shielding collectively containing the entirety of said fiber.

2. The light guide of claim 1 wherein the outer diameter of said tube decreases towards the end where said fiber is fused to said tube.

3. The light guide of claim 1 wherein the inner diameter of said tube increases towards said end opposite said fusing point.

4. The light guide of claim 1 wherein said protective shielding is made from a polymer of fluorocarbon.

5. The light guide of claim 4 wherein said proctective shielding is surrounded by a non-stretchable metal tubing and short rigid tubes fitted over said metal tubing.

6. The light guide of claim 4 wherein the space between said protective shielding and said fiber is filled with a liquid.

7. The light guide of claim 4 wherein ring shaped spacers made of dielectric material are spaced along the length of said protective shielding on the inner surface thereof.

8. The light guide of claim 7 wherein each said spacer has a convex inner surface.

9. The light guide of claim 7 wherein the inner surface of each said spacer is coated with a layer of dielectric material and the space between said protective shielding and said fiber is filled with a liquid having approximately the same index of refraction as said dielectric material.

10. The light guide of claim 6 wherein said fiber is made from homogeneous pure quartz glass and said liquid is a hygroscopic liquid.

11. The light guide of claim 10 wherein said hygroscopic liquid is ethylene glycol.

12. The light guide of claim 10 wherein said fiber consists of a quartz glass capillary where said capillary and said liquid in the area between said protective shielding and said fiber consists of a mixture of $CCl_4$ and $CS_2$.

13. The light guide of claim 1 wherein said protective shielding is coaxially surrounded by a second protective shield, one end of said light guide including a liquid inlet to introduce liquid into the area between said fiber and said protective shielding, the other end of said light guide including a liquid passageway communicating between the area between said fiber and said protective shielding and the area between said protective shielding and said second protective shield, and an outlet at said one end communicating with the area between said protective shielding and said second protective shield to permit liquid to flow out of said light guide.

14. The light guide of claim 1 wherein said tube coaxially interfits into a metal tube.

15. The light guide of claim 1 wherein the end of said fiber fused to said tube is the light exit end of the light guide and the other end of said fiber is freely movable within a second tube shaped substantially the same as said tube.

16. The light guide of claim 1 wherein said protective shielding is surrounded by a flexible metal tubing, said metal tubing including a steel wire fixed to the ends of said metal tubing to limit the dilation of said metal tubing.

* * * * *

UNITED STATES PATENT OFFICE
CERTIFICATE OF CORRECTION

PATENT NO. : 3,920,980
DATED : November 18, 1975
INVENTOR(S) : Gunther Nath

It is certified that error appears in the above-identified patent and that said Letters Patent are hereby corrected as shown below:

Column 2, line 6, replace the words "He-Ne lasers" (second occurrence) with the word --the--.

Signed and Sealed this second Day of March 1976

[SEAL]

Attest:

RUTH C. MASON
*Attesting Officer*

C. MARSHALL DANN
*Commissioner of Patents and Trademarks*